June 12, 1934.                   G. A. BIGGS                   1,962,380
                              HYDRAULIC TURBINE
                             Filed June 21, 1932
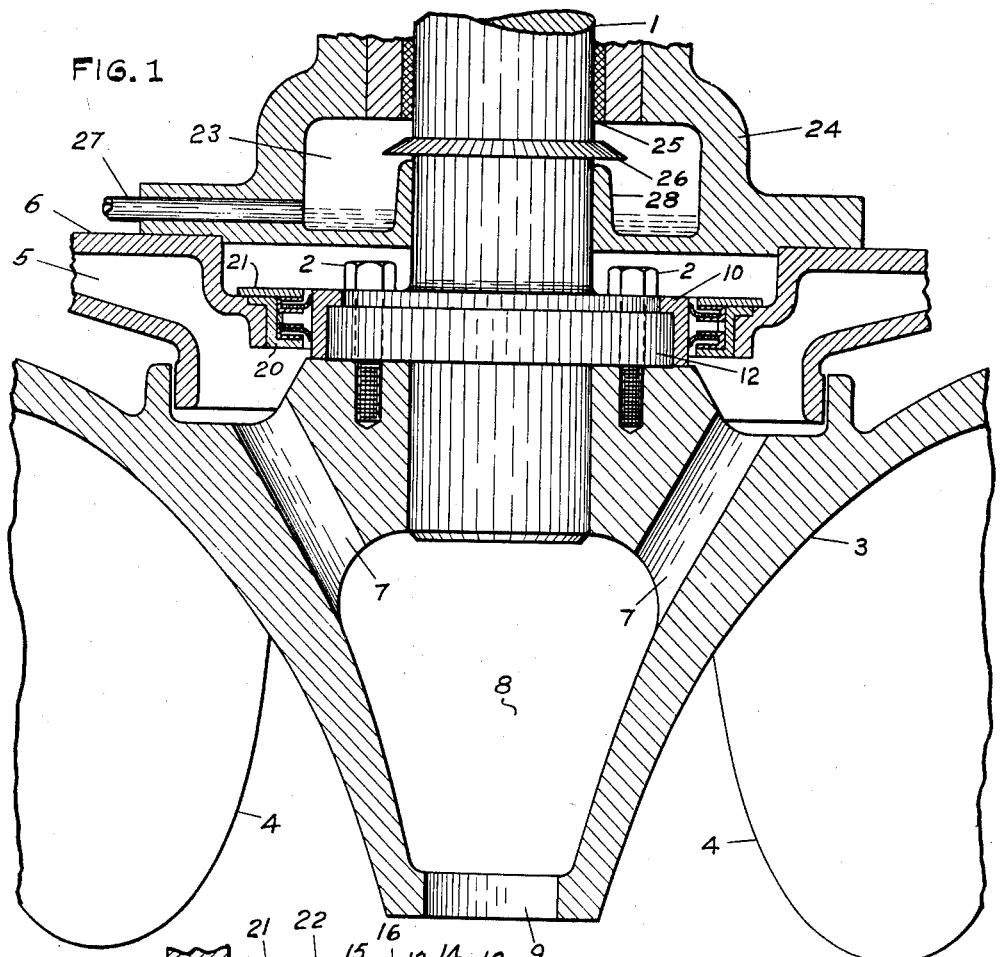
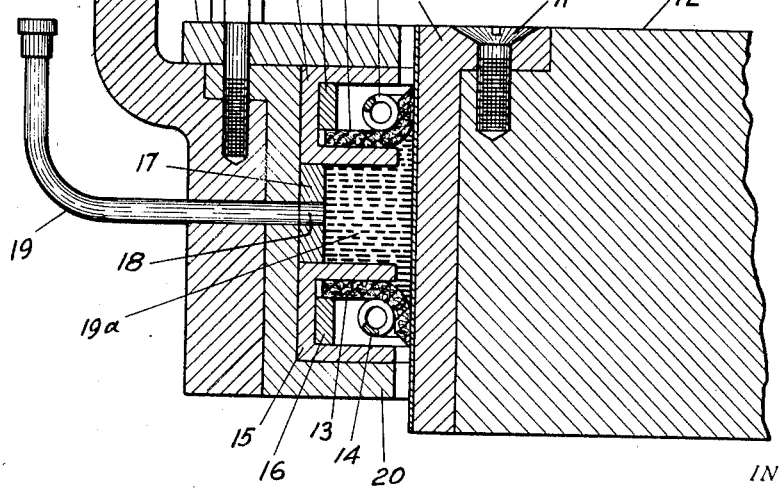
INVENTOR
GEORGE A. BIGGS.
BY
               ATTORNEYS Patented June 12, 1934

1,962,380

UNITED STATES PATENT OFFICE 1,962,380

HYDRAULIC TURBINE

George A. Biggs, Springfield, Ohio, assignor to The James Leffel & Company, Springfield, Ohio, a corporation of Ohio Application June 21, 1932, Serial No. 618,493

9 Claims. (Cl. 253—117)

My invention relates to hydraulic turbines and, in particular, to a means and method of sealing the bearing of the runner shaft with the support and guide for the shaft in order to retain the oil in the bearing and to prevent the introduction of water into the oil.

In particular, it is my object to provide sealed rings for preventing leakage of air or water around a shaft clearance when the runner shaft passes through the top plate of the turbine casing.

It is my object to eliminate the packing boxes now used in the art and to eliminate the necessity of inspection and adjustment which those packing boxes now require.

Referring to the drawing:

Figure 1 is a section through the runner oil chambers and sealing member;

Figure 2 is an enlarged section through the sealing member.

Referring to the drawing in detail, 1 is a runner shaft to which is bolted by the bolts 2 a runner hub 3 having buckets 4. If desired, a portion of the water stream may be injected through the passageway 5 in the cap plate 6 and thence through the passageway 7 into the interior of the hub at 8 and out at 9.

The runner shaft 1 is provided with a shouldered collar or ring 10 having a coating of non-corrosive material such as chromium which gives a highly polished surface. This annular ring 10 is detachably attached by the screws 11 to the shoulder 12 of the runner shaft.

Engaging with the surface of the annular collar 10 are oppositely disposed sealing members consisting of leathers 13 held against the surface of the annular collar by coil springs 14. These leathers are mounted in trough members 15 and held by rings 16. The trough members 15 are held apart by the ported spacer ring 17 which receives through its port 18 a pipe 19. Grease or other lubricant is injected through this pipe into the space 19a. The trough members 15 are so arranged that the lower trough member is mounted upon the flange 20 and the upper trough member is engaged by the cap plate 21 retained by the screws 22.

It will thus be seen that it is impossible for the air or water to enter the chamber 19a and displace the grease or contaminate it.

Superimposed over this construction is the oil reservoir 23 formed by the collar 24 and is supplied with oil that runs down through the bearing 25 over the splash plate 26 and thence makes its exit through the pipe 27. As this reservoir has an internal flange 28 it is desirable to prevent air and water from entering between this flange and the runner shaft 1 into the oil chamber 23. The foregoing construction prevents this and makes a tight seal between the oil chamber or reservoir above the bearing leather rings 13.

The distance between the bottom of the bearing 25 and the top of the cap plate, which is the subject of this invention, that is, the top of the plate 21, can be made materially less where a packing is used such as I employ, which is a very desirable feature, as it reduces the overhang on the runner shaft.

It will be understood that I desire to comprehend within my invention such modifications as may be necessary to adapt it to varying conditions and uses.

Having thus fully described my invention, what I claim as new and desire to secure by Letters Patent, is:

1. In a hydraulic turbine having a runner shaft, a hub and buckets thereon, a shoulder on said shaft, oppositely-disposed spaced sealing members engaging the face of said shoulder forming a chamber with the shoulder, annular members for supporting said sealing members, and means for delivering lubricant to the space formed thereby therebetween.

2. In a hydraulic turbine having a runner shaft, a hub and buckets thereon, a shoulder on said shaft, oppositely-disposed spaced sealing members engaging the face of said shoulder forming a chamber with the shoulder, annular members for supporting said sealing members, means for delivering lubricant to the space formed thereby therebetween, and yielding means holding said sealing means in oppositely disposed directions against the surface of said shoulder.

3. In a hydraulic turbine having a runner shaft, a hub and buckets thereon, a shoulder on said shaft, oppositely-disposed spaced sealing members engaging the face of said shoulder forming a chamber with the shoulder, annular members for supporting said sealing members, means for delivering lubricant to the space formed thereby therebetween, yielding means holding said sealing means in oppositely disposed directions against the surface of said shoulder, and a non-corrosive polished plate surface on said shoulder.

4. In a hydraulic turbine, a seal comprising a highly polished, non-corrosive surface on the shoulder of the runner shaft, spaced, oppositely-disposed, sealing members yieldingly held against said surface, means to support said sealing members forming a chamber therebetween with the surface of the runner shaft between said sealing members.

5. In a hydraulic turbine, a seal comprising a highly polished, non-corrosive surface on the shoulder of the runner shaft, spaced, oppositely-disposed, sealing members yieldingly held against said surface, means to support said sealing members forming a chamber therebetween with the surface of the runner shaft between said sealing members, and means of forcing lubricant in the said space.

6. In a hydraulic turbine having a runner shaft, hollow hub and buckets, means of drawing fluid through said hub, a packing member thereabove engageable with the runner shaft comprising spaced, oppositely-disposed yielding sealing members forming a lubricant chamber therebetween formed by the surface of the runner shaft and sealing members, means of supporting said sealing members in position with respect to the runner shaft, and means of supplying lubricant to the chamber.

7. In a hydraulic turbine having a runner shaft, hollow hub and buckets, means of drawing fluid through said hub, a sealing member thereabove engageable with the runner shaft comprising spaced, oppositely-disposed yielding sealing members having a lubricant chamber therebetween formed by the surface of the runner shaft and sealing members, means of supporting said packing members in position with respect to the runner shaft, means of supplying lubricant to the chamber, a bearing member for said runner shaft superimposed thereover having an oil reservoir between the first mentioned packing member and the bearing member whereby the packing member prevents air and water from entering said oil chamber.

8. In a sealing structure for a hydraulic turbine runner shaft, a detachably plated ring, spaced leather sealing structures oppositely disposed engaging with said ring, annular collars for engaging said sealing structures, coil springs in said sealing structures for engaging the plated ring, means for spacing the annular collars, means for supporting the annular collars, and means for delivering lubricant between the annular collars and the plated ring.

9. In a hydraulic turbine, a shaft having around it a removable ring with an outer surface of chromium, a cap plate having a hole therein to receive the shaft, and oppositely disposed spaced sealing members on the cap plate forming with the cap plate and the ring a lubricant chamber.

GEORGE A. BIGGS.